United States Patent

Greiner et al.

[11] Patent Number: 5,823,502
[45] Date of Patent: Oct. 20, 1998

[54] FASTENING DEVICE FOR A BATTERY IN A VEHICLE

[75] Inventors: Rudolf Greiner, Weil der Stadt, Germany; Torsten Fisch, Birmingham, Ala.

[73] Assignee: Mercedes-Benz AG, Stuttgart, Germany

[21] Appl. No.: 767,254

[22] Filed: Dec. 13, 1996

[30] Foreign Application Priority Data

Dec. 13, 1995 [DE] Germany ............ 195 46 556.3

[51] Int. Cl.⁶ .............................................. A47B 97/00
[52] U.S. Cl. ............................................ 248/503; 180/685
[58] Field of Search .................................. 248/503, 505; 180/68.5

[56] References Cited

U.S. PATENT DOCUMENTS

| | | | |
|---|---|---|---|
| 4,367,572 | 1/1983 | Zielenski | 248/503 X |
| 5,163,505 | 11/1992 | Hoffman et al. | 248/505 X |

FOREIGN PATENT DOCUMENTS

2543308C3  3/1977  Germany.

*Primary Examiner*—Ramon O. Ramirez
*Attorney, Agent, or Firm*—Evenson, McKeown, Edwards & Lenahan P.L.L.C.

[57] ABSTRACT

This invention relates to a fastening device for a vehicle battery having a shell fixedly received in the vehicle for placing the battery and having a clamping bow which clamps the battery to the shell and extends in a U-shape over the battery. For reducing the manufacturing costs while the mounting times are shorter, the clamping bow is constructed as a one-piece U-shaped tension band made of spring steel with suspension hooks formed at the leg ends and a protuberance shaped out in the band web and pointing away from the battery top side. By pressing the protuberance flat, the suspension hooks can be hooked into corresponding suspension members on the shell, and after the release of the protuberance, the battery is force-lockingly fixed on the shell by means of the tension band.

23 Claims, 1 Drawing Sheet

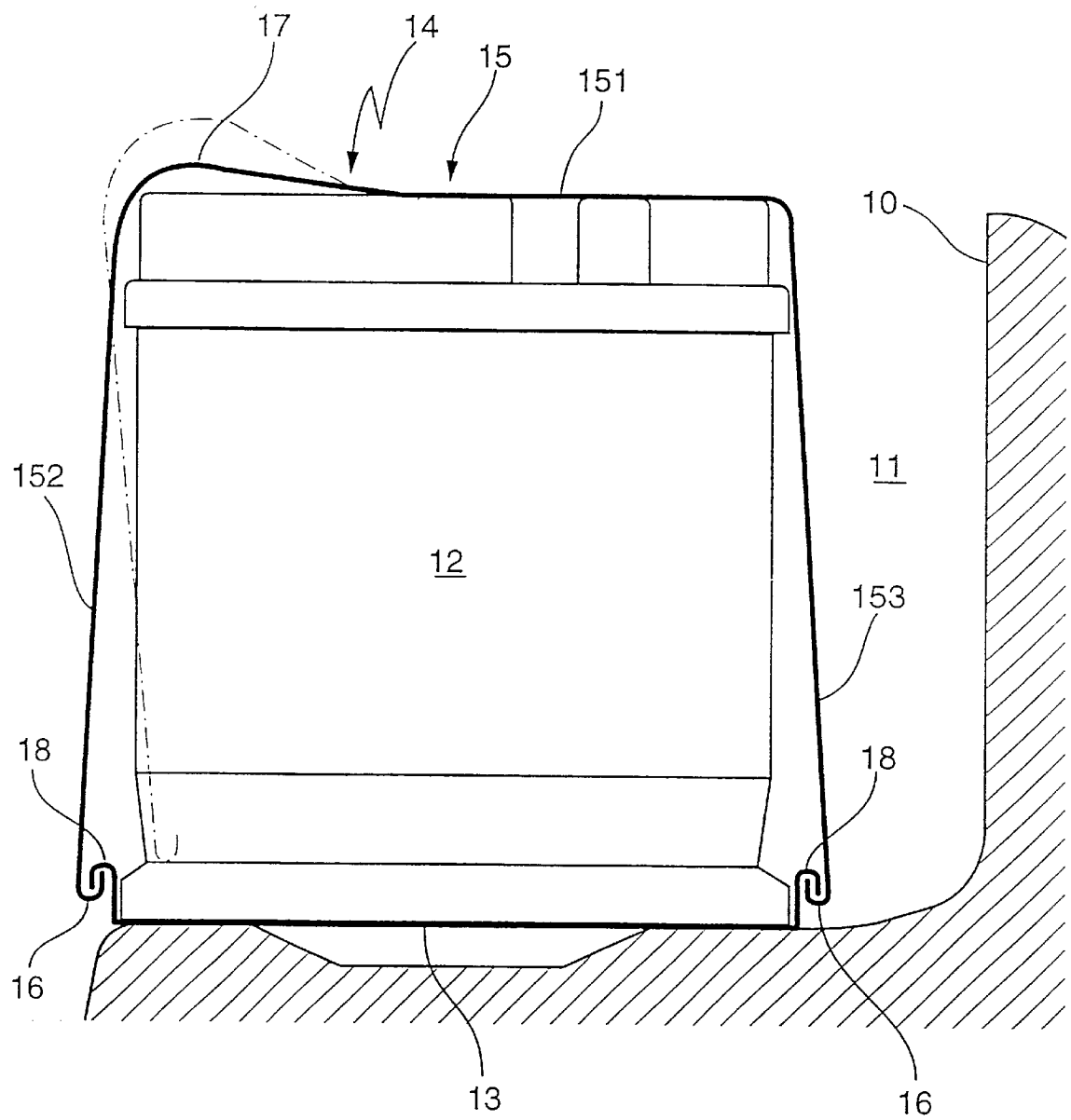

FASTENING DEVICE FOR A BATTERY IN A VEHICLE

BACKGROUND AND SUMMARY OF THE INVENTION

This invention relates to a fastening device for a battery in a vehicle, particularly in the engine space of a motor vehicle, having a shell fixedly arranged in the vehicle for placing the battery and having a clamping bow which, from the shell, extends in a U-shape over the battery and which, on at least one bow end, by means of a suspension member molded on there in one piece, can be suspended in a corresponding suspension member arranged on the shell.

In the case of a known fastening device of this type (German Patent Document DE 25 43 308), the shell has a deep-drawn, tub-shaped construction and carries on its upper edge on opposite sides, on the one hand, a fastening screw and, on the other hand, a suspension lug. The clamping bow, which in the center has a lever arrangement with a tension lever for tensioning the clamping bow, is fastened on one bow end by way of an angle piece by means of a threaded nut on the fastening screw and reaches behind the suspension lug by means of a suspension hook constructed on the other bow end. By moving the tension lever by 180°, the bow length is shortened and the battery is clamped to the shell. With respect to its manufacturing, such a tension bow requires high expenditures and is therefore expensive and is built up considerably on the top side of the battery because of the tension lever arrangement situated there.

It is an object of the invention to provide a fastening device for a vehicle battery of the initially mentioned type which can be produced at much lower cost, is easy to mount and can be used also in the case of narrow space conditions.

In the case of a fastening device of the type referred to above, this object is achieved according to the invention by providing an arrangement wherein the clamping bow is constructed as a one-piece, U-shaped tension band made of spring steel which has a band web pressing onto the battery top side and first and second band legs extending on opposite side walls of the battery to the shell when in an in use battery holding position, and wherein at least one protuberance is constructed such in the band web and directed away from the battery top side that, by means of the flat-pressing of the protuberance, a first suspension member on an end of the first band leg can be caused to lock with a corresponding suspension member on the shell.

The fastening device according to the invention has the advantage of an extremely low-cost manufacturing because the clamping bow consists only of a single band of spring steel on which only one protuberance and at least one suspension member are formed out. Any types of joints and connecting parts, which are necessary in the case of the known clamping for shortening and lengthening the bow, are eliminated. The mounting is extremely simple and fast. The tension band which is pushed in a U-shape over the battery or the battery housing is fastened on the shell by means of its one leg end and is then hung by means of its suspension member by the flattening of the protuberance into the corresponding suspension member of the shell. After the release of the protuberance, the battery is clamped to the shell. The protuberance is arranged close to the side wall of the battery and, after the bracing of the battery, projects only slightly beyond the battery top side so that the space above the battery can be utilized completely, for example, for damping materials on the engine hood. The fastening device according to the invention can be used universally on batteries of different constructions and power.

Advantageous embodiments of the fastening device according to the invention with expedient further developments and embodiments of the invention are described herein and in the claims.

According to a preferred embodiment of the invention, a suspension member is also shaped onto the end of the second band leg and is connected to a second corresponding suspension member arranged on the shell. By means of the construction of the other leg fastening device of the clamping bow also as a suspension member, which interacts with another corresponding suspension member on the shell, the time expenditures for the mounting and demounting of the tension lever during the battery installation or battery change is further shortened.

According to a preferred embodiment of the invention, the band-side suspension member is constructed as a hook with a hook opening pointing away from the shell and the shell-side corresponding suspension member is constructed as a groove with a groove opening pointing away from the tension band. As the result, for the manufacturing of the suspension hook and of the corresponding suspension hook, only a few additional manufacturing measures are required which contributes to the reduction of costs.

Although the invention has been described and illustrated in detail, it is to be clearly understood that the same is by way of illustration and example, and is not to be taken by way of limitation. The spirit and scope of the present invention are to be limited only by the terms of the appended claims.

BRIEF DESCRIPTION OF THE DRAWINGS

The single drawing FIGURE is a schematic sectional view depicting a vehicle battery and a battery fastening device constructed according to a preferred embodiment of the invention.

DETAILED DESCRIPTION OF THE DRAWINGS

In the single drawing figure, reference number 10 indicates the contours of an engine space 11 of a motor vehicle illustrated as a cutout. A vehicle battery 12 is inserted into the engine space 11 and is held securely by means of a fastening device. The drawing shows the frontal side or end face of the vehicle battery 12 which extends by means of its longest dimension into the plane of the projection.

The fastening device comprises a shell 13 which is fixed in the engine space 11 and onto which the battery 12 is placed, and a clamping bow 14 which, in a U-shape, extends transversely over the battery 12 for the stable connection of the battery 12 with the shell 13. The clamping bow 14 is constructed as a one-piece, U-shaped tension band 15 made of spring steel with a width of approximately 40 mm (in a direction perpendicular to the plane of the drawing figure), whose U-shaped construction is adapted to the dimensions of the battery 12. As a result, in the one-piece tension band 15 made of spring steel, a band web 151 is defined which presses onto the battery top side, and two band legs 152, 153 extend on two opposite side walls of the battery 12 to the shell 13. At the end of each band leg 152, 153, a suspension member is arranged in the form of a suspension hook 16. With the suspension opening pointing away from the shell 13, each suspension hook 16 is bent toward the interior in one piece on the band leg end. In the band web 151 of the tension band 15, a protuberance 17 is constructed which preferably is constructed close to the transition of the band web 151 into one of the band legs 152, pointing away from the battery top side such that, by the application of force, the protuberance 17 can be pressed flat more or less toward the battery top side.

The shell 13 carries corresponding suspension members for receiving the suspension hooks 16 on the tension band 15 which are arranged on the opposite longitudinal sides of the shell 13. Preferably the corresponding suspension members are constructed as grooves 18 which are bent in one piece from the longitudinal sides of the shell 13 toward the outside and which extend along the whole longitudinal side of the shell 13 with the opening pointing in the downward direction, that is, away from the tension band 15.

For installing the vehicle battery 12 in the engine space 11, the battery 12 is inserted in the shell 13. Then the tension band 15 is placed transversely over the battery 12 so that its band web 151 rests on the top side of the battery 12 and its two band legs 152, 153 extend downward to the shell 13. First, the suspension hook 16 which is constructed on the end of the band leg 153 situated the farthest away from the protuberance 17 is suspended into the groove 18 on the shell 13. As a result, the other band leg 152 presses against the battery side wall, as illustrated by a dash-dotted line in the drawing for the band leg 152. Now, for example, by means of the thumb, the protuberance 17 in the band web 151 is pressed flat, whereby the band leg 152 swivels toward the outside and the suspension hook 16 constructed on the leg end moves toward the groove 18. The suspension hook 16 is pushed over the groove 18 so that it reaches behind it, and subsequently the protuberance 17 is released. The protuberance 17, which then partially springs back, pulls the suspension hook 16 into the groove 18 and thus locks the battery 12 in a form-locking manner to the shell 13.

For changing the battery, the protuberance 17 in the tension band 15 must again be pressed flat whereby the suspension hook 16 on the end of the band leg 152 pushes downward out of the groove 18. By means of a slight spreading-away of the band leg 152 from the battery 12, the suspension hook 16 moves some distance from the groove 18 such that and when the protuberance 17 is released, it moves past the groove 18. Now the suspension hook 16 on the band leg 153 can be unhinged from the groove 18 on the other side of the shell 13 and the tension band 15 can be pulled off the battery. The battery can now be taken out of the shell 13 and be replaced by a new battery. The subsequent fastening of the new battery takes place as described above.

The invention is not limited to the described embodiment. Thus, the protuberance 17 can also be arranged in the center, or a protuberance can be provided close to each band leg 152, 153 in the band web 151. However, an optimal position of the protuberance 17 is as described above for especially preferred embodiments of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fastening device for a battery in a vehicle, particularly in the engine space of a motor vehicle, having:
    a shell fixedly arranged in the vehicle for placing the battery;
    a clamping bow extending from the shell in a U-shape over the battery, the clamping bow having on at least one bow a one piece suspension member molded thereon;
    wherein the clamping bow can be suspended in a corresponding suspension member arranged on the shell;
    wherein the clamping bow is constructed as a one-piece, U-shaped tension band made of spring steel, the clamping bow further having a band web pressing onto the top side of the battery and first and second band legs extending on opposite side walls of the battery to the shell; and
    wherein one protuberance is constructed in the band web and directed away from the battery top side such that, by pressing the protuberance in a downward direction, a first suspension member on an end of the first band leg can be caused to lock or unlock with a corresponding suspension member on the shell, thereby facilitating a one hand movement of the clamping bow between locked and unlocked positions.

2. A device according to claim 1, wherein the at least one protuberance in the band web of the tension band is arranged close to a transition of the first band web to the band leg carrying the first suspension member on an end thereof.

3. A device according to claim 2, wherein a second suspension member is also formed on an end of the second band leg of the tension band, which second suspension member is in an operative connection with a second corresponding suspension member arranged on the shell when in the in use battery holding position.

4. A device according to claim 2, wherein the band web of the tension band extends transversely with respect to a longitudinal axis of the battery when in the in use battery holding position.

5. A device according to claim 2, wherein the tension band width measure approximately 40 mm.

6. A device according to claim 1, wherein a second suspension member is also formed on an end of the second band leg of the tension band, which second suspension member is in an operative connection with a second corresponding suspension member arranged on the shell when in the in use battery holding position.

7. A device according to claim 6, wherein said first and second suspension members are each constructed as a suspension hook with a hook opening pointing away from the shell, and the shell-side corresponding suspension member is constructed as a groove with a groove opening pointing away from the tension band.

8. A device according to claim 6, wherein the band web of the tension band extends transversely with respect to a longitudinal axis of the battery when in the in use battery holding position.

9. A device according to claims 1, wherein the first suspension member is constructed as a suspension hook with a hook opening pointing away from the shell, and the shell-side corresponding suspension member is constructed as a groove with a groove opening pointing away from the tension band.

10. A device according to claim 9, wherein the at least one protuberance in the band web of the tension band is arranged close to a transition of the first band web to the band leg carrying the first suspension member on an end thereof.

11. A device according to claim 9, wherein the band web of the tension band extends transversely with respect to a longitudinal axis of the battery when in the in use battery holding position.

12. A device according to claim 9, wherein the tension band width measures approximately 40 mm.

13. A device according to claim 1, wherein the tension band width measures approximately 40 mm.

14. A device according to claim 1, wherein the band web of the tension band extends transversely with respect to a longitudinal axis of the battery when in the in use battery holding position.

15. A fastening system for detachably holding a battery in position in a vehicle comprising:

a shell defining a bottom support for a bottom portion of a battery, suspension hooks fixed at opposite sides of the shell, and a substantially U-shaped spring steel band with suspension hooks at respective opposite ends which are releasably engageable with respective ones of the suspension hooks at the shell when a battery is held in position with a battery bottom portion in the shell and said band elastically pressing the battery toward said shell bottom support, wherein said U-shaped band is shaped in an untensioned position with a protuberance which is manually engageable to tension the band against the battery to accommodate connection of the respective suspension hooks;

wherein the protuberance is constructed in the band and directed away from the battery top side such that, by pressing the protuberance in a downward direction, a first suspension member on an end of the first band leg can be caused to lock or unlock with a corresponding suspension member on the shell, thereby facilitating a one hand movement of the clamping bow between locked and unlocked positions.

16. A fastening system according to claim 15, wherein said protuberance includes an upwardly curved band section provided on a portion of said band engageable in use with a top side surface of a battery.

17. A fastening system according to claim 15, wherein said U-shaped band includes a pair of legs connected by a bridging portion, said bridging portion in use clampingly engaging a top side of the battery supported at the shell bottom support, said legs extending from the bridging portion of the U-shaped band to respective ones of said suspension hooks.

18. A fastening system according to claim 17, wherein said protuberance is an upwardly curved part of said bridging portion.

19. A fastening system according to claim 18, wherein said protuberance is disposed adjacent one of said legs.

20. A hold down device for a battery in a vehicle located within the engine space of a motor vehicle, having:

a rectangular shell fixedly arranged in the vehicle for receiving the battery;

a single U-Shaped tension band extending from the shell in a U-shape and extending transversely over the battery, the tension band having on at least one end a one piece suspension member molded thereon;

the tension band being made of spring material, the tension band further having a band web which presses against a top side of the battery and first and second band legs extending in use on opposite side walls of the battery to the shell;

the first and second legs being elastically biased in an inward direction toward each other and the respective side walls of the battery;

the tension band further having a single protuberance constructed in the band web that is directed away from the battery top side;

wherein the tension band can be suspended in a corresponding suspension member arranged on the shell; and wherein the tension band is configured such that manual pressing of the protuberance in a downward and inward direction causes a first suspension member on an end of the first band leg to lock with a corresponding suspension member on the shell;

whereby, a user of the hold down device may engage the device by merely pressing downward on the protuberance of the tension band.

21. A hold down device according to claim 20, wherein the tension made of steel.

22. A hold down device according to claim 20, wherein the at least one suspension members are bent in an inward direction.

23. A hold down device according to claim 22, wherein the at least one suspension members are bent into the shape of hooks.

* * * * *